US010489296B2

(12) United States Patent
Gellerich et al.

(10) Patent No.: US 10,489,296 B2
(45) Date of Patent: Nov. 26, 2019

(54) QUALITY OF CACHE MANAGEMENT IN A COMPUTER

(71) Applicant: INTERNATIONAL BUSINESS MACHINES CORPORATION, Armonk, NY (US)

(72) Inventors: Wolfgang Gellerich, Boeblingen (DE); Peter M. Held, Renningen (DE); Gerrit Koch, Ammerbuch (DE); Christoph Raisch, Gerlingen (DE); Martin Schwidefsky, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/272,459

(22) Filed: Sep. 22, 2016

(65) Prior Publication Data

US 2018/0081813 A1    Mar. 22, 2018

(51) Int. Cl.
*G06F 12/0862* (2016.01)
*G06F 12/0811* (2016.01)
*G06F 9/38* (2018.01)

(52) U.S. Cl.
CPC ........ *G06F 12/0862* (2013.01); *G06F 9/3802* (2013.01); *G06F 12/0811* (2013.01); *G06F 2212/283* (2013.01); *G06F 2212/602* (2013.01)

(58) Field of Classification Search
CPC ............. G06F 12/0862; G06F 12/0811; G06F 2212/283; G06F 2212/602
See application file for complete search history.

(56) References Cited

U.S. PATENT DOCUMENTS

| 5,894,569 | A  | 4/1999 | Arimilli et al. |
| 6,108,775 | A  | 8/2000 | Shiell et al. |
| 6,360,220 | B1 | 3/2002 | Forin |
| 6,367,071 | B1 | 4/2002 | Cao et al. |
| 6,598,152 | B1 | 7/2003 | Sinharoy |
| 6,715,064 | B1 | 3/2004 | D'Sa et al. |
| 7,328,332 | B2 | 2/2008 | Tran |
| 7,549,022 | B2 | 6/2009 | Baker |

(Continued)

FOREIGN PATENT DOCUMENTS

| EP | 1810130 B1 | 11/2011 |
| JP | 2005520222 A | 7/2005 |

OTHER PUBLICATIONS

David Daly: "Cache Restgoration for Highly Partitioned Virtualized Systems", IEEE No. 978-1-4673-0826; 2011; pp. 10.

(Continued)

*Primary Examiner* — Yaima Rigol
(74) *Attorney, Agent, or Firm* — Cantor Colburn LLP; Margaret McNamara

(57) ABSTRACT

Embodiments here relate to managing a cache by exploiting a cache line hierarchy is provided. Managing the cache includes reading cache references of a first task from a cache reference save area of a first task data structure in response to a context switch. Further, managing the cache includes prefetching and restoring cache lines of the first task to the cache based on the cache references. Note that the cache lines can be predetermined from a plurality of cache lines associated with the first task during an extraction operation with respect to the first task and the cache line hierarchy.

7 Claims, 6 Drawing Sheets

(56) References Cited

U.S. PATENT DOCUMENTS

| | | | |
|---|---|---|---|
| 7,634,642 B2 | 12/2009 | Hochschild et al. | |
| 7,647,452 B1 | 1/2010 | Moll et al. | |
| 7,844,973 B1 | 11/2010 | Dice | |
| 8,020,169 B2 | 9/2011 | Yamasaki | |
| 8,131,982 B2 | 3/2012 | Emma et al. | |
| 8,141,098 B2 | 3/2012 | Bradford et al. | |
| 8,261,049 B1 | 9/2012 | Kang et al. | |
| 8,347,309 B2 | 1/2013 | Smolens et al. | |
| 8,473,727 B2 | 6/2013 | Dunn et al. | |
| 8,539,212 B1 | 9/2013 | Kang et al. | |
| 8,990,506 B2 | 3/2015 | Cherukuri et al. | |
| 9,069,675 B2 | 6/2015 | Greiner et al. | |
| 2003/0023663 A1* | 1/2003 | Thompson | G06F 9/383 718/108 |
| 2004/0088525 A1 | 5/2004 | D'Sa et al. | |
| 2005/0114637 A1 | 5/2005 | John et al. | |
| 2006/0095750 A1 | 5/2006 | Nye et al. | |
| 2006/0212658 A1* | 9/2006 | Hrle | G06F 12/0862 711/137 |
| 2008/0052499 A1 | 2/2008 | Koc | |
| 2009/0313462 A1 | 12/2009 | Emma et al. | |
| 2011/0145473 A1* | 6/2011 | Maheshwari | G06F 12/0866 711/103 |
| 2011/0219190 A1 | 9/2011 | Ng et al. | |
| 2011/0264843 A1* | 10/2011 | Haines | G06F 12/0246 711/103 |
| 2012/0254837 A1 | 10/2012 | Frazier et al. | |
| 2013/0191825 A1 | 7/2013 | Muff et al. | |
| 2013/0339691 A1 | 12/2013 | Bonanno et al. | |
| 2013/0339697 A1 | 12/2013 | Bonanno et al. | |
| 2014/0095849 A1 | 4/2014 | Xekalakis et al. | |
| 2014/0223107 A1 | 8/2014 | Sadok et al. | |
| 2014/0258629 A1* | 9/2014 | Busaba | G06F 12/0862 711/130 |
| 2014/0289731 A1 | 9/2014 | Wei | |
| 2015/0039870 A1 | 2/2015 | Scott et al. | |
| 2016/0055095 A1 | 2/2016 | Faraboschi et al. | |
| 2018/0150413 A1 | 5/2018 | Parker et al. | |

OTHER PUBLICATIONS

Wolfgang Gellerich, et al.; "Improving Quality of Cache Management in a Computer," U.S. Appl. No. 15/440,109, filed Feb. 23, 2017.

List of IBM Patents or Patent Applications Treated as Related; Date Filed: Sep. 22, 2016, pp. 1-2.

Wolfgang Gellerich, et al.; "Method for Managing Tasks in a Computer System," U.S. Appl. No. 14/953,633, filed Nov. 30, 2015.

Wolfgang Gellerich, et al.; "Method for Managing Tasks in a Computer System," U.S. Appl. No. 15/065,911, filed Mar. 10, 2016.

Chen et al.; "Process Switches and Branch Prediction Accuracy"; Dept. of Electrical and Computer Engineering, Rice University; Retrieved Online from http://www.owlnet.rice.edu/~elec525/projects/pbp_report.pdf on Nov. 30, 2015; pp. 1-9.

\* cited by examiner

Extract Cache References
510

Prefetch Cache References
550

QUALITY OF CACHE MANAGEMENT IN A COMPUTER

BACKGROUND

Customers expect performance improvements for every new computer model. In the past, advances in solid state physics allowed increasing clock frequency from about 1 MHz around 1980 to several GHz today. However, currently, improvements of solid state physics have become more difficult. Increased speed of program execution may thus come from improved CPU structure, such as utilizing cache memory.

In general, cache memory can be hardware and/or software components of a computer that store data to server future data requests. The data stored in the cache memory can result, for example, from of an earlier computation, or be duplicated from data stored elsewhere. The data stored in the cache memory can be called cache contents, which can further be referred to as cache lines (i.e., a contiguous sequence of memory cells). A cache hit occurs when the requested data can be found in the cache memory. Cache hits are served by reading data from the cache memory, which can be served faster from the cache memory than re-computing a result or reading from a slower data store. A cache miss occurs when the requested data cannot be found in the cache memory.

An example of management of a cache memory will now be described. When execution of a new or first program begins by a computer, the cache memory is empty in the sense that none of the data items needed by the program (i.e., a working set) are available from the cache memory. In turn, when execution of the first program begins, a first access of a data item will cause a cache miss. To avoid subsequent cache misses, the cache memory is loaded with the data items needed by the program from a memory of the computer. Thus, as the first program executes, the data items needed by the program are loaded over time into the cache memory based on requests from that first program. This loading over time fails to the initial time consuming cache misses, which are not optimal for the first program.

Another example of management of a cache memory will now be described with respect to the computer and the first program described above. When an operating system of the computer performs a context switch (i.e., a switch from the first program to a second program), the cache memory will contain lines used by the first program (e.g., the working set of the first program) immediately after the context switch because the context switch itself does not change an actual cache content of the cache memory. That is, after the context switch, the cache memory does not contain a working set relevant to the second program; rather, the second program accesses data items in the memory and builds its working set while replacing older data (e.g., possibly the working set of the first program) in the cache memory. Thus, when execution of the second program begins, accesses by the second program to data items of the cache memory will therefore cause time consuming cache misses, which are not optimal for the second program.

SUMMARY

According to an embodiment, a method of managing a cache by exploiting a cache line hierarchy is provided. The method comprises reading, by a processor, cache references of a first task from a cache reference save area of a first task data structure in response to a context switch; prefetching and restoring, by the processor, cache lines of the first task to the cache based on the cache references, wherein the cache lines were predetermined from a plurality of cache lines associated with the first task during an extraction operation with respect to the first task and the cache line hierarchy.

According to other embodiments, the method can be embodied in a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments herein relate to improving a quality of cache management in a computer by reducing or eliminate the number of cache misses between a processor and a memory of the computer with respect to a context switch. Embodiments herein reduce or eliminate cache misses via a saving a portion or more of a working set of cache lines used by a first process when a context switch is about to put the first process into a sleeping state. Then, embodiments herein restore to the cache these cache lines by pre-fetching the portion or more of the working set before the first process continues executing.

Figure 1:
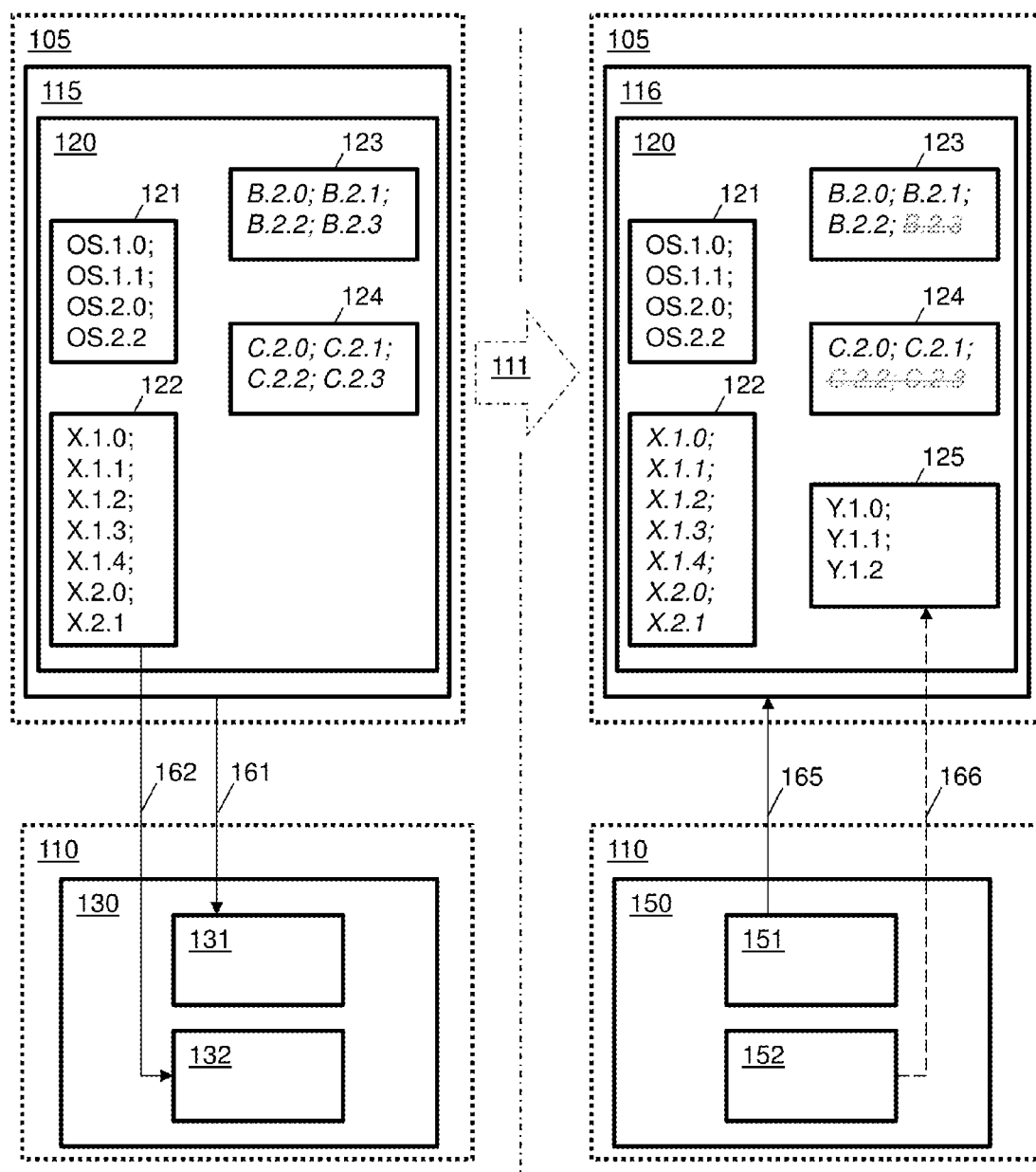
FIG. 1 shows a schematic view of a computer system and a flow of information between components of the computer system in accordance with an embodiment.

FIG. 1 is a schematic view of a computer system 100 and a flow of information between components of the computer system in accordance with an embodiment. The computer system 100 includes a processor 105 and a system memory 110. The processor 105 and the system memory 110 are shown as dotted-boxes to represent hardware or vitalized hardware. FIG. 1 further illustrates the processor 105 and system memory 110 operating with respect to two process instances, e.g., before and after, surrounding a context switch 111, where the logical states of the processor 105 and the system memory 110 are represented as solid lined, dot-dashed, and dashed illustrations. Two process instances are shown executed by the processor 105 because, in general, only one process can be executed by one core of the processor 105 at a time.

The before instance includes illustrations to the left of the context switch 111, while the after instance includes illustrations to the right. The before instance relates to when the processor 105 is executing/running Task X as a first task 115, while the after instance relates to when the processor 105 is executing/running Task Y as a second task 116. Note that operations with respect to the context switch 111 can occur before, during, and after the context switch 111. Further, because performing the context switch 111 consumes a plurality of processor cycles, operations that occur during the context switch 111 can occur early, in-the-middle, or late in the process.

The processor 105, in general, can access registers of the system memory 110 to read, load, restore, and save cache lines with respect to the first and second tasks 115 and 116. The processor 105 can also maintain data previously accessed in a hierarchy of caches. To schedule and perform the context switch 111, the processor 105 can utilize a process scheduler (e.g., a mechanism to determine which programs are admitted to the computer system 100 for processing, and subsequently queue and load determined programs for execution).

Regarding the before instance, the processor 105 has loaded onto a cache 120 working sets 121, 122, 123, and 124. The working sets 121, 122, 123, and 124 are data loaded into the cache 120 based on a request of a corresponding process/task. The cache lines of each working set 121, 122, 123, and 124 are represented by a three field designation ("[Field 1], [Field 2], [Field 2]"). Field 1 indicates which process/task owns or is associated with a cache line. Field 2 indicates a hierarchy of the cache lines. The hierarchy of cache lines can be used to implement saving and restoring of cache lines at one particular cache level. Examples of hierarchies include, but are not limited to, level 1, level 2, etc. and hot vs. cold. With respect to hot vs. cold, a hot cache line has been recently called by a process/task (e.g., data that has been recently used by a current task), while a cold cache line has relatively not been called (e.g., data that has not been used recently). As shown in FIG. 1, hot cache lines are designated by a 1 within Field 2, while cold cache lines are designated by a 2 within Field 2. Field 3 indicates an ordinal value of the cache line.

As shown in FIG. 1, the working set 121 for the operating system of the computer system 100 includes hot cache lines OS.1.0 and OS.1.1 and cold cache lines OS.2.0 and OS.2.1. The working set 122 for the Task X includes hot cache lines X.1.0, X.1.1, X.1.2, X.1.3, and X.1.4 and cold cache lines X.2.0 and X.2.1. The working set 123 for Task B includes cold cache lines B.2.0, B.2.1, B.2.2, and B.2.3. The working set 124 for Task C includes cold cache lines C.2.0, C.2.1, C.2.2, and C.2.3. The working set 125 for Task Y includes hot cache lines Y.1.0, Y.1.1, and Y.1.2.

Further, italics are utilized to designate whether the cache lines are relevant to the current process/task. Non-italics cache lines are relevant, while italics cache lines are irrelevant. As shown, in the before instance, the cache lines corresponding to the working sets 123 and 124 of the Tasks B and C are italicized to illustrate that they are not relevant to the Task X. In the after instance, the cache lines corresponding to the working sets 122, 123, and 124 of the Tasks X, B, and C are italicized to illustrate that they are not relevant to the Task Y. The cache lines corresponding to the working set 121 of the operating system are relevant, as the any process/task will utilize these cache lines.

With respect to the before instance, the system memory 110 provides registers for storage of a data structure 130 of the Task X via a register save area 131 and a cache reference save area 132. With respect to the after instance, the system memory 110 provides registers for storage of a data structure 150 of the Task Y via a register save area 151 and a cache reference save area 152.

Figure 2:
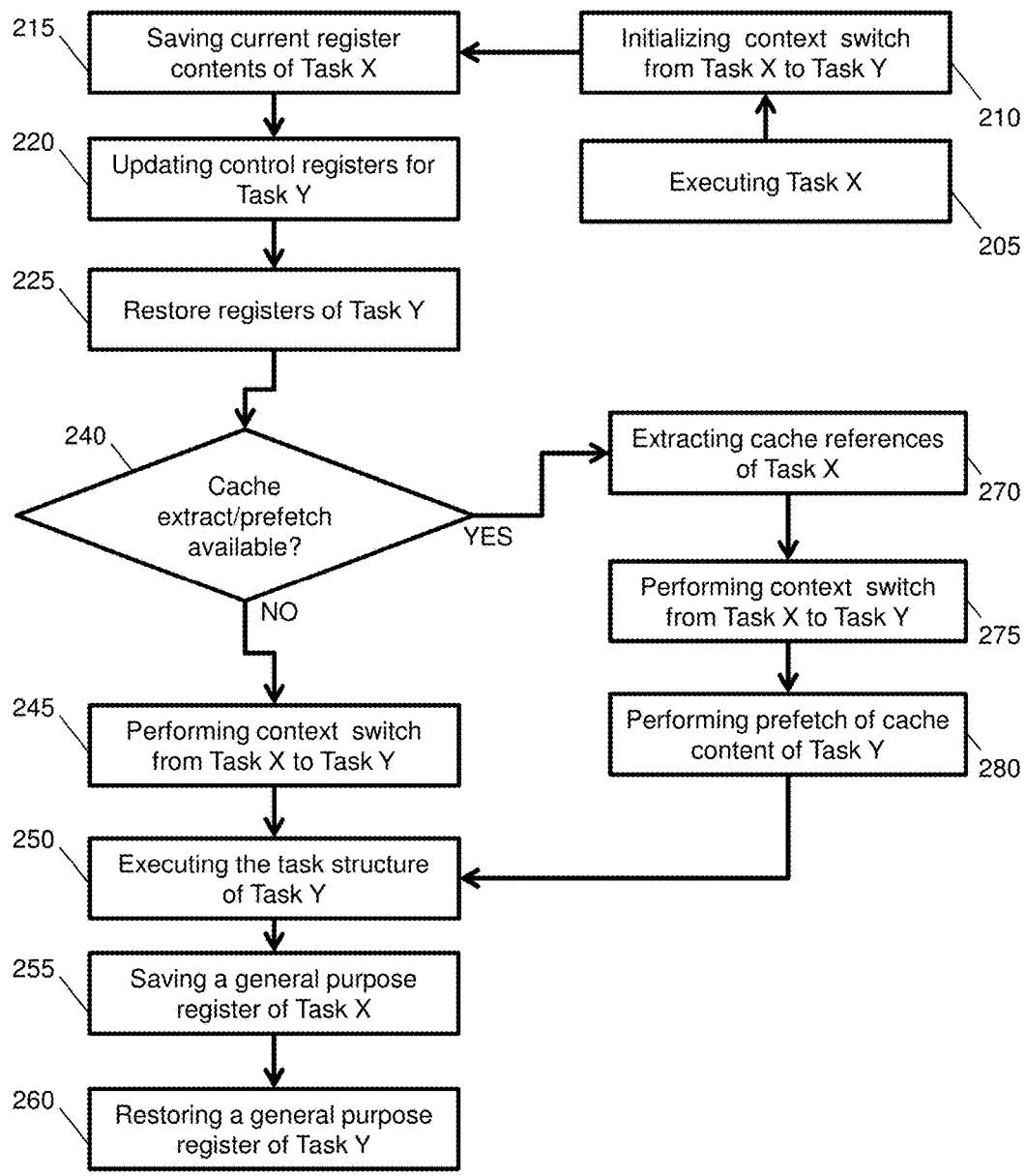
FIG. 2 shows a process flow of a method for managing tasks in a computer system in accordance with an embodiment.

An operation of the computer system 100 of FIG. 1 that exploits the hierarchy of the cache lines (e.g., hot/cold operations) will now be described according to an embodiment. Further, the operation of the computer system 100 of FIG. 1 will be described in relation to FIG. 2. FIG. 2 shows a process flow 200 of a method for managing the switching between Tasks X and Y in a computer system in accordance with an embodiment. The process flow 200 begins at block 205, where the processor 105 of FIG. 1 executes/runs Task X.

At block 210, the context switch 111 from Task X to Task Y initializes. The context switch 111 causes Task X to eventually enter into a sleeping state. The context switch 111 can cause save operations. For example, saving cache lines (and restoring as described herein) can be triggered by executing particular machine instructions which the operating system executes as part of performing the context switch 111. Note that saving and restoring cache lines can also be implemented by enhancing an already existing mechanism used to perform the context switch 111. Save operations store current register contents (e.g., data items or cache lines) of any currently running process/task so that these current register contents can be restored at a later time. Thus, at block 215, the processor 105 of FIG. 1 saves current register contents of Task X in the data structure 130, i.e., in the register save area 131 (e.g., arrow 161 of FIG. 1). The current register contents, data items, or cache lines can include access, floating point control, and floating point registers of Task X, such that the working set 122 of cache lines of Task Y are save based on context switch 111.

At blocks 220 and 255, the processor 105 of FIG. 1 updates control registers and restores register contents (e.g., data items or cache lines) of Task Y from the data structure 150 (e.g., arrow 165 of FIG. 1). Note that restoring cache lines (and saving as described herein) can be triggered by executing particular machine instructions which the operating system executes as part of performing the context switch 111. The register contents, data items, or cache lines can include access, floating point control, and floating point registers of Task Y. Also note that, in this embodiment, Task Y was started and paused at a time before Task X. Thus, the cache references and register contents of the Task Y have been already been saved and extracted prior to running of Task X. For instance, the register contents and cache references of the Task Y are stored in the data structure 150, i.e., respectively in the register save area 151 and the cache reference save area 152. Further, the control registers are updated and the register contents are restored prior to the actual context switch 111.

Then, at decision block 240, the processor 105 of FIG. 1 determines whether extract and/or prefetch operations are available. The time between the saving of block 215 and the restoring of block 225 permits the determination of whether extract and/or prefetch operations are available, which can include whether bandwidth available. If the extract and/or prefetch operations are not available, the process flow 200 proceeds to block 245 (e.g., as shown by the 'NO' arrow). At block 245, the context switch 111 from Task X to Task Y is performed. At block 250, the processor 105 of FIG. 1 executes the task structure of the next task. Note that, in general, whenever a new task starts (e.g., Task Y), a first access of a data item from the register save area 151 will cause a cache miss. At block 255, the processor 105 of FIG.

1 saves a general purpose register of Task X within the data structure 130. At block 260, the processor 105 of FIG. 1 restores a general purpose register of Task Y from the data structure 150.

Returning to decision block 240, if the extract and/or prefetch operations are available, the process flow 200 proceeds to block 270 (e.g., as shown by the 'YES' arrow). At block 270, the processor 105 of FIG. 1 performs an extraction operation by extracting cache references of the Task X. The extraction operation stores addresses of memory contents (e.g., current register contents) in the cache reference save area 132, rather the memory contents themselves. The addresses to be saved can be shortened. Those bits selecting bytes within the cache line can be omitted. Depending on conventions for allocating data areas within the address space, further bits can be omitted (e.g., because a typical 64 bit process does not use memory above 4 TB).

The extraction operation further exploits the hierarchy of the cache lines to provide the most recently used cache lines when the currently running process/task resumes (i.e., select only the right subset of the cache lines to save and restore). For example, before the context switch 111, the processor 105 extracts (e.g., arrow 162 of FIG. 1) cache references of the first task 115 (e.g., Task X) from the cache 120 to the cache reference save area 132. The cache references extracted are the hot cache lines of the first task 115, i.e., hot cache lines X.1.0, X.1.1, X.1.2, X.1.3, and X.1.4. In this way, the extraction operation maintains a required space (e.g., minimize the system memory 110 used) to balance expected performance improvements. The extraction operation can achieve this balance by a constant number and a minimal size of cache reference save area.

Figure 3:
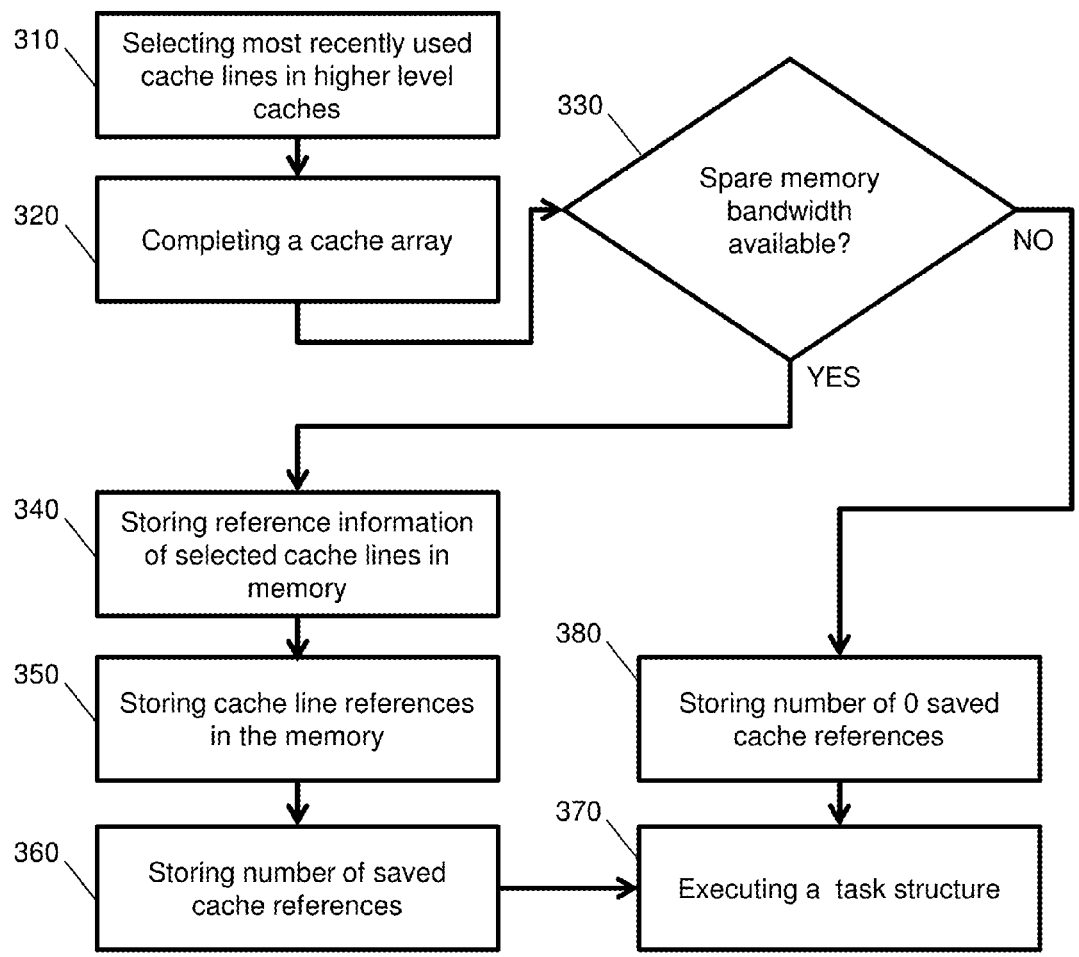
FIG. 3 shows a process flow of an extract operation in accordance with an embodiment.

The extraction operation is further described with respect to FIG. 3, which shows a process flow 300 in accordance with an embodiment. The process flow 300 begins at block 310, where most recently used cache lines in higher level caches are selected. The processor 105 of FIG. 1 can select a number of cache lines to save during the extraction operation, as the saving of more cache lines than is needed has disadvantages (e.g., causing unnecessary memory and data bus traffic). In turn, if cache lines that are not needed are saved, then the restoring of those cache lines may replace lines that might be useful for other processes, libraries, or the operating system. Thus, the processor 105 can select the number of cache lines to save to cache lines actually used by Task X. This can be performed by selecting the hot cache lines that belong to the processor 105 and include a process identification (PID), which is marker logically associating the cache lines to the process or task. In this way, PID marking can be used/read when the cache save prefetch decision is made, can be used to select everything associated with the task, or can be used to select everything since the last selection. Regarding selection everything since the last selection, the processor 105 of FIG. 1 can record at that point in time when last context switch occurred and select only what has changed since that point in time.

For example, saving cache lines can be restricted to a value of lines of an available buffer provided by the operating system 100 (e.g., MAX_LINES). Further, processes with high data locality may access less than MAX_LINES cache lines. However, since hardware provides the number of actually saved lines, the computer system 100 can either return this value in a register or store it at a fixed location within the buffer.

In addition, because the cache 120 maintains a marker storing information for every cache line, this information can be used for cache management. For instance, the selecting of the cache lines to save can make use of the markers when determining which lines have the highest priority for getting saved. The markers can also be used replacement decision, such as when the cache 120 uses replacement strategies to determine which lines to replace when a new line needs to be loaded, as described during the prefetching herein.

Continuing with FIG. 3 at block 320, a cache array is completed. Then, at decision block 330, whether spare memory bandwidth is available is determined. Before saving cache lines, an implementation may check whether the system memory 110 has bandwidth available.

If the spare memory bandwidth is available, the process flow 300 proceeds to block 340 (e.g., as shown by the 'YES' arrow). Two instructions can be executed if there is sufficient memory bandwidth available. If system memory 110 is busy, the system memory 110 would only write the length information, indicating a length of zero. Vice versa, a restore operation would only transfer data if there is enough memory bandwidth available and length of saved data is greater than zero. This assures that the overall performance is not suffering because of the new save/restore of cache lines. At block 340, reference information of selected cache lines are stored in memory. At block 350, cache line references are stored in memory. At block 360, a number of saved cache references are stored. At block 370, a task structure is executed.

Returning to decision block 330, if the spare memory bandwidth is not available, the process flow 300 proceeds to block 380 (e.g., as shown by the 'NO' arrow). An example of the spare memory bandwidth not being available includes when the bandwidth is needed for other memory activity. In turn, the saving of the cache lines is canceled. At block 380, a number of zero saved cache references are stored (e.g., the number of saved cache lines is set to 0). Then, the process flow 300 proceeds to block 370 where a task structure is executed.

In another embodiment, the extraction operation can determine whether the cache lines identified for saving belong to a particular process because only cache lines belonging to the process being put into sleep state will be saved (e.g., hot cache lines X.1.0, X.1.1, X.1.2, X.1.3, and X.1.4). The processor 105 of FIG. 1 identifies processes using a process identification (PID), which can be some integer number. IN an embodiment, the PID can be to each cache line (e.g., such as inserting a value into Field 1). Further, to reduce an amount of additional data, a hash value derived from the pro PID can be used. Note that a single processor core system, a single bit that gets switched upon every context switch occurs can be used to identify those cache lines belonging to the process just executed. Some computer systems may share the same cache among more than one processor and/or among more than one processor core. In this case, cache lines not only get said bit as a marker but additionally an indication to which processor and/or core is executing the process.

Returning to FIG. 2, at block 275, the context switch 111 from Task X to Task Y is performed. During the context switch 111, the context switch 111 causes Task X to enter into the sleeping state and the cache 120 remains unchanged (e.g., the processor 105 still has the working sets 121, 122, 123, and 124 loaded onto the cache 120). Thus, to avoid cache misses noted at block 245, cache logic of the computer system 100 of FIG. 1 loads data items respective to the second task 116 (e.g., Task Y) from the system memory 110, as shown at block 280.

At block 280, the processor 105 of FIG. 1 performs a prefetch of cache content of Task Y. The prefetch of cache content includes reading cache references of to Task Y from a cache reference save area 152 the cache reference save area 152 of the data structure 150 and prefetching and restoring, by the processor, cache lines of the first task to the cache based on the cache references. During the prefetch, cold cache lines that are irrelevant to Task Y can be removed/deleted and hot cache lines of Task Y can be restored/loaded (e.g., older data in the cache 120 is replaced by more recently used data). The computing system 100 of FIG. 1 can utilize different strategies, such as least frequently used (LFU) and/or least recently used (LRU) strategies, to replace old data with new.

For example, after the context switch 111 and before the execution of Task Y (in advance of completed switch), the processor 105 reads (e.g., arrow 166 of FIG. 1) cache references of Task Y to prefetch and restore the proper cache lines of Task Y. The prefetch operation (i.e., read, prefetch, and restore) is further described with respect to FIG. 4, which shows a process flow 400 in accordance with an embodiment. The process flow 400 begins at decision block 410, where whether a number of saved cache references is greater than zero is determined.

That is, when the process scheduler of the processor 105 of FIG. 1 switches to a new process (Task Y), the cache reference save area 152 of the data structure 150 is read. If the number of saved cache references is greater than zero, the process flow 400 proceeds to decision block 420 and/or block 430 (e.g., as shown by the 'YES' arrow).

In another embodiment, at decision block 420, whether spare memory bandwidth is available is determined because prefetching saved cache lines may be canceled depending on the availability of memory bandwidth. Decision block 420 is optional, as shown by the dashed outline of decision block 420. If the spare memory bandwidth is available, the process flow 400 proceeds to block 425 (e.g., as shown by the 'YES' arrow). Similar to how extracting operations are handled, two instructions can be executed if there is sufficient memory bandwidth available.

At block 425, the saved cache references of the cache reference save area 152 of the data structure 150 are read. At block 430, an asynchronous prefetch of cache lines are performed. Note that reading of the saved cache references of the cache reference save area 152 of the data structure 150 permits a subsequent asynchronous prefetch of cache lines related to those saved cache references. At block 440, cache line references are stored in memory. At block 450, a cache array is completed.

Thus, if the number of saved cache lines is larger than 0, the cache references of Task Y (addresses of the saved cache lines) are read and sent to a cache prefetcher (e.g., a module of the processor responsible for executing the prefetch operation). Based on the cache references of Task Y, the hot cache lines of the working set 125, i.e., hot cache lines Y.1.0, Y.1.1, and Y.1.2, are pulled via the cache reference save area 152 to replace the removed cold cache lines of Task B (e.g., B.2.2) and of Task C (e.g., C.2.2 and C.2.3). Note that cache lines that are formatted with a strike-through have been removed from the cache 120, but are still shown by FIG. 1 to assist with explanations herein.

Then, the process flow 400 processes to circle 455 so as to end. Returning to decision block 410, if the number of saved cache references is not greater than zero, the process flow 400 proceeds to circle 455 so as to end (e.g., as shown by the 'NO' arrow). Also, returning to decision block 420, if the spare memory bandwidth is not available, the process flow 400 proceeds to circle 455 so as to end (e.g., as shown by the 'NO' arrow).

Returning to FIG. 2, the process flow 200 proceeds to block 250 for execution of Task Y after the completion of block 280. At block 250, the processor 105 executes/runs Task Y and, due to the prefetching, Task Y finds at least the working set 125 available in cache 120 when it continues and avoids all cache misses with respect to starting Task Y. Note that the implementation of the extract and restore operations of blocks 270 and 280 can be either two machine instructions or an enhancement to an already existing mechanism used to perform context switching. Further, extract and restore operations and other actions can be carried out during a context switch. Furthermore, the extract and restore operations can be done in parallel without extra time consumption.

An embodiment is shown in FIG. 2, where the prefetching of 280 can be performed after the context switch 111 is complete and before Task Y starts running. In another embodiment the prefetching of 280 can be performed as part of the context switch 111, such as an early operation during the context switch 111. Note that it is advantageous to trigger cache prefetching very early so the memory subsystem 110 can perform this action while the processor 105 is still doing other operations of the context switch 111.

Figure 4:
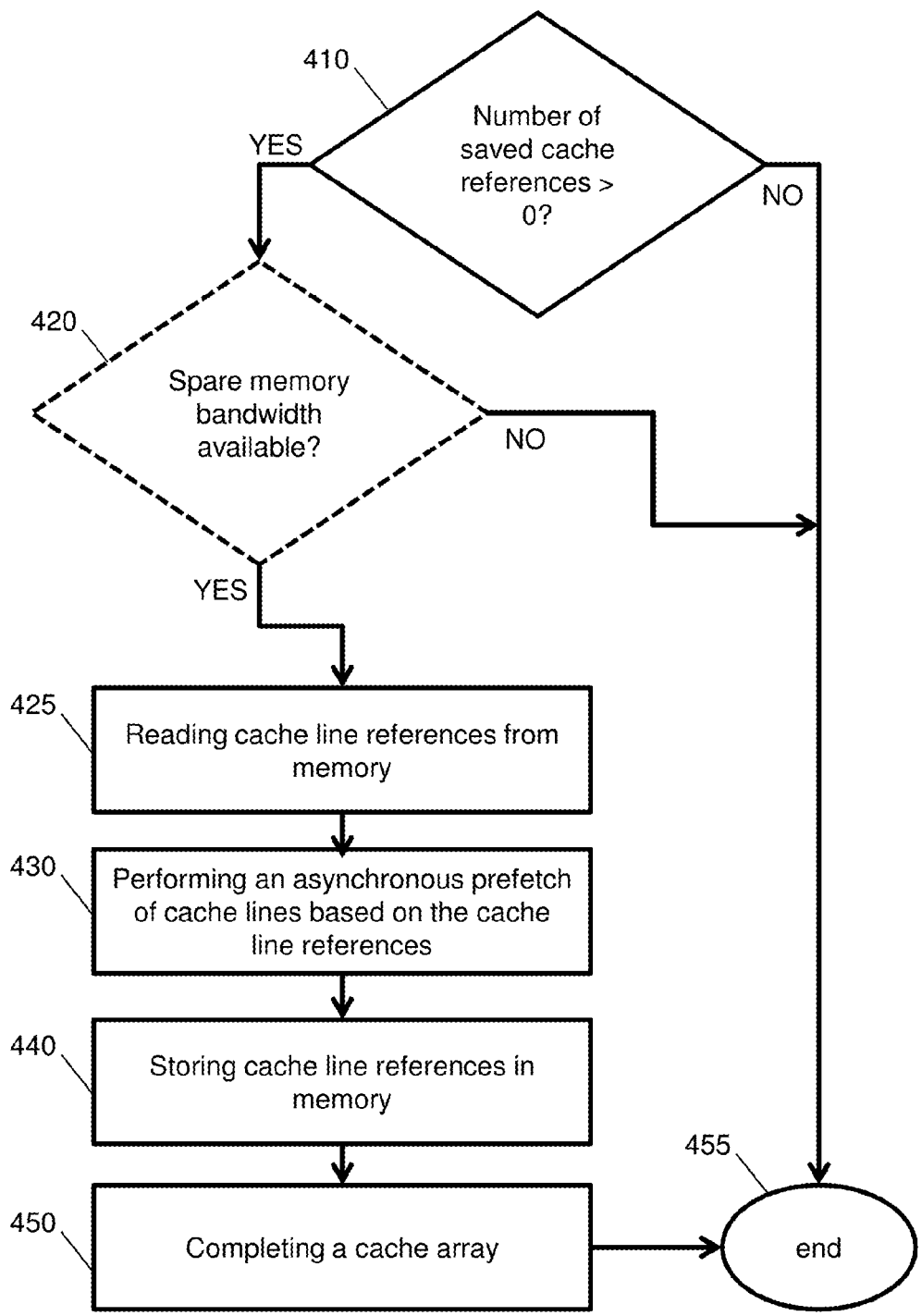
FIG. 4 shows a process flow of a prefetch operation in accordance with an embodiment.
Figure 5:
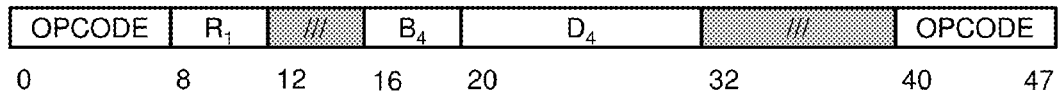
FIG. 5 shows instruction definitions for save or prefetch operations in accordance with an embodiment.
Figure 5:
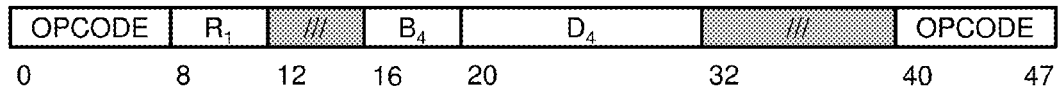

In view of the FIGS. 3-4, FIG. 5 shows instruction definitions for extract or prefetch operations in accordance with an embodiment. As shown, the instruction definitions include a save cache references 510 and the prefetch cache references 550. The save cache references 510 and the prefetch cache references 550 start with a code that defines the instruction for extracting or prefetching (e.g., OPCODE at bit 0). The field $R_1$ at bit 8 specifies a register with an identification of the task-relating data (e.g., data items related to the task). The fields $B_4$ and $D_4$ designate a base register and a displacement that form an address of the memory location within the register save area.

Figure 6:
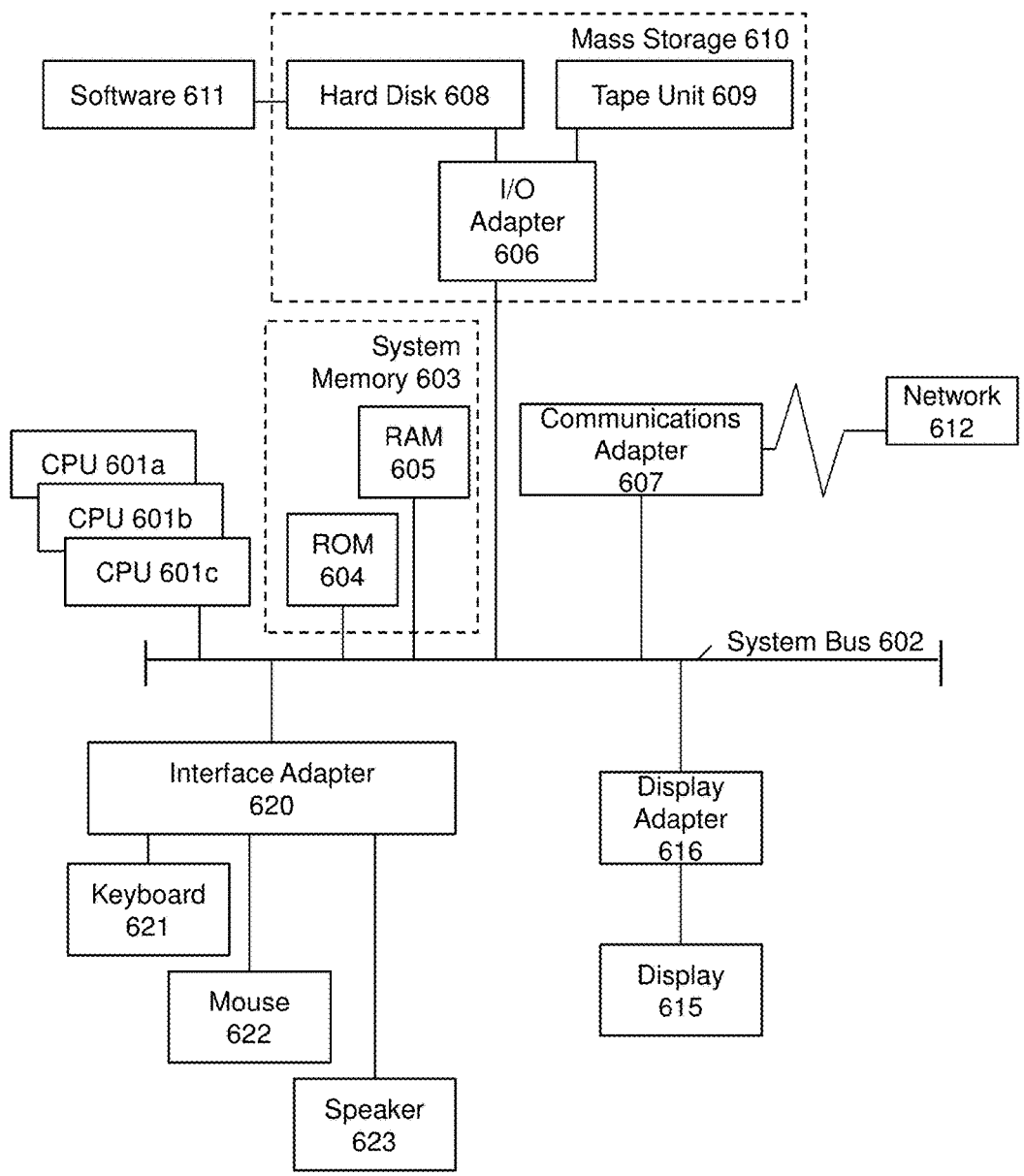
FIG. 6 illustrates a processing system in accordance with an embodiment.

Referring now to FIG. 6, there is shown an embodiment of a processing system 600 for implementing the teachings herein. In this embodiment, the processing system 600 has one or more central processing units (processors) 601*a*, 601*b*, 601*c*, etc. (collectively or generically referred to as processor(s) 601). The processors 601, also referred to as processing circuits, are coupled via a system bus 602 to system memory 603 and various other components. The system memory 603 can include read only memory (ROM) 604 and random access memory (RAM) 605. The ROM 604 is coupled to system bus 602 and may include a basic input/output system (BIOS), which controls certain basic functions of the processing system 600. RAM is read-write memory coupled to system bus 602 for use by processors 601.

FIG. 6 further depicts an input/output (I/O) adapter 606 and a network adapter 607 coupled to the system bus 602. I/O adapter 606 may be a small computer system interface (SCSI) adapter that communicates with a hard disk 608 and/or tape storage drive 609 or any other similar component. I/O adapter 606, hard disk 608, and tape storage drive 609 are collectively referred to herein as mass storage 610. Software 611 for execution on processing system 600 may be stored in mass storage 610. The mass storage 610 is an example of a tangible storage medium readable by the processors 601, where the software 611 is stored as instructions for execution by the processors 601 to perform a method, such as the process flows of FIGS. 2-4. Network adapter 607 interconnects system bus 602 with an outside network 612 enabling processing system 600 to communicate with other such systems. A screen (e.g., a display monitor) 615 is connected to system bus 602 by display adapter 616, which may include a graphics controller to improve the performance of graphics intensive applications and a video controller. In one embodiment, adapters 606, 607, and 616 may be connected to one or more I/O buses that are connected to system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 602 via an interface adapter 620 and the display adapter 616. A keyboard 621, mouse 622, and speaker 623 can be interconnected to system bus 602 via interface adapter 620, which may include, for example, a Super I/O chip integrating multiple device adapters into a single integrated circuit.

Thus, as configured in FIG. 6, processing system 600 includes processing capability in the form of processors 601, and, storage capability including system memory 603 and mass storage 610, input means such as keyboard 621 and mouse 622, and output capability including speaker 623 and display 615. In one embodiment, a portion of system memory 603 and mass storage 610 collectively store an operating system, such as the z/OS or AIX operating system from IBM Corporation, to coordinate the functions of the various components shown in FIG. 6.

Technical effects and benefits include finding a working set (or at least a portion thereof) available in cache, when a process continues so as not to suffer from cache misses after a context switch, based on saving cache lines of old tasks in response to the context switch and restoring saved cache lines by pre-fetching during the context switch. Technical effects and benefits also include having only the right cache lines selected for saving and restoring to maintain any required space in balance expected performance improvements. Thus, embodiments described herein are necessarily rooted in a computer system to perform proactive operations to overcome problems specifically arising in the realm of computers that are limit by a constant number and minimal size of a cache reference save area.

In view of the disclosure herein, examples of the technical effects and benefits are now described. Contemporary technologies can embody an elementary form of prefetching cache lines before a context switch; however, these elementary forms of prefetching cache lines by these contemporary technologies offer no resolution for particularly selecting those cache lines that should be prefetched. In contrast, embodiments herein exploit a hierarchy of the cache lines to provide the most recently used cache lines when the currently running process/task resumes.

Contemporary technologies may also restore cache lines previously used by a currently inactive virtual machine before a scheduler activates the virtual machine again; however, embodiments herein save and restore cache lines with respect to operating system level processes. Because a granularity of the objects being scheduled is much smaller and a frequency of performing scheduling activities is much higher with respect to operating system level processes than a granularity and a frequency concerned with virtual machines, the saving and sorting of cache lines with respect to virtual machines does not address issues associated with and the different demands of operating system level processes. For instance, differences between virtual machine processes and operating system level processes exist in when and how cache lines are selected for later prefetching. That is, embodiments herein select which cache lines to save and restore in an advantageous way for operating system level processes.

In an example of the virtual machine approach, all cache lines are marked with an ID (identification). Further, the virtual machine approach selects cache lines for later prefetching when the cache line is about to get evicted from the cache and its ID is different to the currently active virtual machine's ID, i.e. it belongs to an inactive virtual machine. In turn, if this condition matches, the cache line's address is added to a list maintained for the virtual machine it belongs to. This has the disadvantage that this list must be located and accessed for every cache line.

Embodiments herein invention work differently than the virtual machine approach in that the cache lines are selected when the operating system is about to deactivate a process and with respect to being prefetched at a later time. This allows for selecting only the hottest cache lines for later prefetching because the "hotness information" is still available and up to date at the time embodiments herein select the lines. The advantage is that the amount of additional memory traffic caused by prefetching can be minimized. Further, embodiments herein reduce the risk that prefetching might load lines that are not needed later but replace lines that would have still been used. This technical feature is not part of the virtual machine approach.

The virtual machine approach also suggests that the number of lines to prefetch simply be limited so that prefetching does not create additional memory traffic is addressed in the paper; however, embodiments herein go much further in making the decision on whether or not to prefetch depending on the current memory traffic caused by real cache misses.

Yet another difference is how cache lines used by several processes are treated. The virtual machine approach marks a cache line as being shared when a virtual machine accesses a cache line already marked as belonging to a different virtual machine. Such shared lines never get replaced. In contrast, embodiments herein do not have to deal with lines shared among processes. Rather, embodiments herein are concerned with cache lines belonging to the operating system. These can be identified as accesses are done in the operating system's processor state.

Embodiments may include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product, the computer program product comprising a computer readable storage medium having program instructions managing a cache by exploiting a cache line hierarchy embodied therewith, the program instructions executable by a processor to cause the processor to perform:

reading cache references of a first task from a cache reference save area of a first task data structure in response to a context switch;

extracting cache references of a second task by reading cache references of the second task from a cache reference save area of a second data structure; and asynchronously prefetching by executing a prefetch instruction definition to exploit the cache line hierarchy, the asynchronously prefetching comprising restoring hot cache lines, as cache lines of the first task, to the cache to replace cold cache lines based on the cache references, the prefetch instruction definition comprising a code defining the prefetch instruction definition for prefetching, a first field specifying a register with an identification of data items related to the first task, a base field designating a base register, and a displacement field designating a displacement, wherein the cache lines were predetermined from a plurality of cache lines associated with the first task during an extraction operation with respect to the first task and the cache line hierarchy.

2. The computer program product of claim 1, wherein the extracting by the processor includes executing an extract instruction definition comprising a code defining the extract instruction definition for prefetching, a first field specifying a register with an identification of data items related to the second task, a base field designating a base register, and a displacement field designating a displacement.

3. The computer program product of claim 1, wherein the prefetching is performed after the context switch and before an execution of first task.

4. The computer program product of claim 1, wherein the base register forms an address of a memory location within a register save area of the data structure of the first task.

5. The computer program product of claim 1, wherein the context switch comprises changing from an execution of the second task to an execution of the first task.

6. A system, comprising a processor and a memory storing program instructions managing a cache by exploiting a cache line hierarchy thereon, the program instructions executable by a processor to cause the system to perform:

reading cache references of a first task from a cache reference save area of a first task data structure in response to a context switch;

extracting cache references of a second task by reading cache references of the second task from a cache reference save area of a second data structure; and asynchronously prefetching by executing a prefetch instruction definition to exploit the cache line hierarchy, the asynchronously prefetching comprising restoring hot cache lines, as cache lines of the first task, to the cache to replace cold cache lines based on the cache references, the prefetch instruction definition comprising a code defining the prefetch instruction definition for prefetching, a first field specifying a register with an identification of data items related to the first task, a base field designating a base register, and a displacement field designating a displacement, wherein the cache lines were predetermined from a plurality of cache lines associated with the first task during an extraction operation with respect to the first task and the cache line hierarchy.

7. The system of claim 6, wherein the prefetching is performed after the context switch and before an execution of first task.

* * * * *